United States Patent
Gill et al.

(10) Patent No.: US 7,372,657 B2
(45) Date of Patent: May 13, 2008

(54) MECHANISM FOR MINIMIZING UNLOAD TIMES IN A TAPE DRIVE SYSTEM

(75) Inventors: Richard Allen Gill, Arvada, CO (US); Bradley E. Whitney, Erie, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 8 days.

(21) Appl. No.: 11/440,599

(22) Filed: May 24, 2006

(65) Prior Publication Data

US 2007/0273998 A1 Nov. 29, 2007

(51) Int. Cl.
G11B 15/48 (2006.01)

(52) U.S. Cl. .................................... 360/74.1
(58) Field of Classification Search .................... None
See application file for complete search history.

(56) References Cited

U.S. PATENT DOCUMENTS

| | | | |
|---|---|---|---|
| 5,485,321 A * | 1/1996 | Leonhardt et al. | 360/48 |
| 5,572,378 A * | 11/1996 | Schwarz et al. | 360/48 |
| 5,847,893 A * | 12/1998 | Ishihara et al. | 360/74.4 |
| 5,969,893 A * | 10/1999 | Basham et al. | 360/49 |
| 6,016,233 A * | 1/2000 | Scholz et al. | 360/15 |
| 6,349,356 B2 * | 2/2002 | Basham et al. | 711/111 |
| 7,085,091 B1 * | 8/2006 | Kientz | 360/74.1 |

OTHER PUBLICATIONS

StorageTek Product: T10000 tape drive; StorageTek; http://www.storagetek.com/products/product_page2773.html.
Sun/StorageTek T10000 tape drive; Sun Microsystems, Inc., Technical Brief, Oct. 2005.
Sun StorageTek T10000 Tape Drive; Storage Solutions, Sun Microsystems, Inc., 2006.

* cited by examiner

Primary Examiner—K. Wong
(74) Attorney, Agent, or Firm—Dorsey & Whitney LLP

(57) ABSTRACT

In one embodiment, a method and apparatus for minimizing unload times in a tape drive system is disclosed. The method includes: writing to a tape in serpentine format; reaching a comparison point on the tape, wherein at the comparison point an actual capacity is compared to an expected capacity; utilizing the comparison at the comparison point to estimate a distance from the comparison point until a guaranteed capacity for the tape is reached; and determining a turn-around point on the tape based on the estimated distance, wherein at the turn-around point a tape drive writing to the tape to stop writing in a first direction and then continue writing in a second direction opposite from the first direction and towards a physical beginning of the tape. Other embodiments are also disclosed.

20 Claims, 4 Drawing Sheets

MECHANISM FOR MINIMIZING UNLOAD TIMES IN A TAPE DRIVE SYSTEM

FIELD OF INVENTION

An embodiment of the invention relates to media storage systems, and more specifically, to minimizing unload times in a tape drive system.

BACKGROUND OF INVENTION

Advanced tape storage devices write data on multiple data tracks on media tapes, which run parallel to each other over the length of the tape. Often times, data is written to the tape in a serpentine format. While using the serpentine format, a tape head of the tape drive begins writing at the start of the tape continues to the end of the length of the tape. Then, the drive steps the head to the next track below, reverses direction, and writes back to the beginning of the length of the tape, and so on. In this manner, the tape head traces a "serpentine-like" figure on the tape as it moves along the tape writing data.

Currently, tape drive systems that guarantee a fixed capacity allocate more recordable media than the fixed capacity requires. The extra recording space is used for write defect skipping. In this way, a system can guarantee, within some probability of defective media events, that the media will hold the advertised capacity.

For linear tape recording systems utilizing serpentine formats that traverse a tape from beginning to end many times, the actual logical end of the tape is at the beginning of the tape closest to its unload point. In this way, minimum unload times for the tape are realized. However, in such a system, when the tape reaches its advertised guaranteed capacity limit, the tape drive ceases to accept more data. A problem arises because the point on the tape where this may occur can be some distance from the beginning of the tape, and therefore unload time for the tape is increased.

For example, one type of media tape may measure 800 meters in length. For a system utilizing a serpentine format, a "wrap" of the tape is known as a single pass of the tape head on the tape before it changes tracks and writes in the opposite direction for another wrap. In some cases, each wrap that runs the length of the tape may hold on the average of approximately 22 Gigabytes (GB) of data. Furthermore, there may be 24 wraps that a tape head will perform while writing data to the tape, resulting in a total writable media space of 528 GB on the tape.

Continuing with the example, assume that the advertised capacity limit of the tape is 500 GB and 500 GB of data is written to the tape without any errors that would require expansion into the extra writing defect space on the tape. In this case, the tape head will stop writing at a point that is about 95% actual capacity of the tape. However, this point is only about two-thirds down the length of the $23^{rd}$ wrap of the tape, or 533.33 meters away from the physical beginning of the tape.

As a result, when the media drive unloads the tape when it has completed writing, a time delay occurs due to the rewinding of the tape to its physical beginning in order to unload it from the drive. If this problem is magnified over many tapes, then the time delays accumulate and create a significant burden on the tape storage system. A system that reduces the unload time for tapes written in a serpentine format would be beneficial.

SUMMARY OF INVENTION

The present invention includes novel methods and apparatus for minimizing unload times in a tape drive system.

According to one embodiment of the invention, a method is disclosed. The method includes: writing to a tape in serpentine format; reaching a comparison point on the tape, wherein at the comparison point an actual capacity is compared to an expected capacity; utilizing the comparison at the comparison point to estimate a distance from the comparison point until a guaranteed capacity for the tape is reached; and determining a turn-around point on the tape based on the estimated distance, wherein at the turn-around point a tape drive writing to the tape to stop writing in a first direction and then continue writing in a second direction opposite from the first direction and towards a physical beginning of the tape.

According to another embodiment of the invention, an apparatus is disclosed. The apparatus includes a tape to store media and a tape drive to write the media to the tape. The tape drive includes a tape head to physically write the media to the tape; and a control unit. In addition, the control unit operates to: write to the tape in a serpentine format; utilize a comparison at a comparison point on the tape to estimate a distance from the comparison point until a guaranteed capacity for the tape is reached; and determine a turn-around point on the tape based on the estimated distance, wherein at the turn-around point the tape drive to stop writing in a first direction and then continue writing in a second direction opposite from the first direction and towards a physical beginning of the tape.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
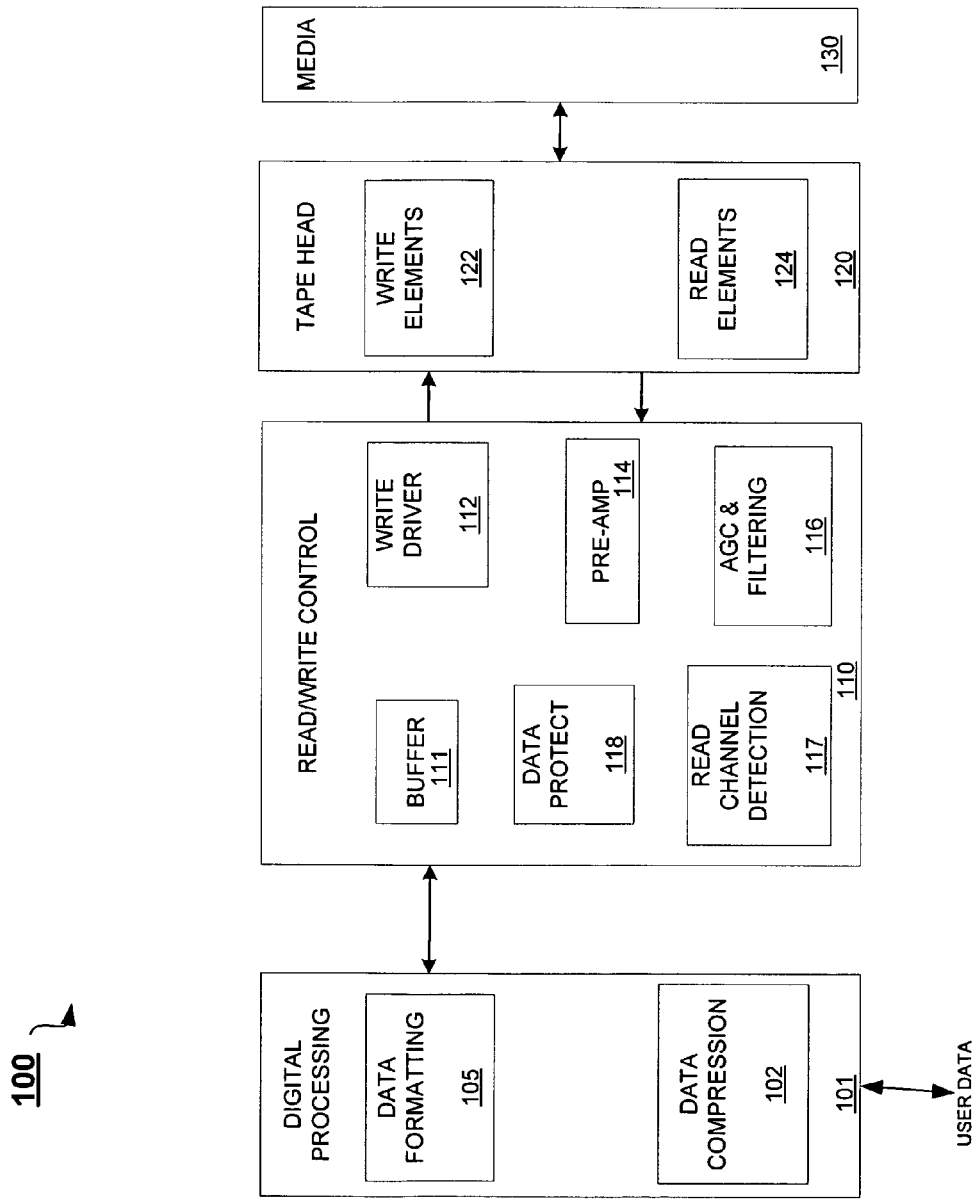
FIG. 1 is a block diagram of one embodiment of an exemplary tape drive carrying out embodiments of the invention.

A method and apparatus are described for minimizing unload times in a tape drive system. According to one embodiment, the method includes: writing to a tape in serpentine format; reaching a comparison point on the tape, wherein at the comparison point an actual capacity is compared to an expected capacity; utilizing the comparison at the comparison point to estimate a distance from the comparison point until a guaranteed capacity for the tape is reached; and determining a turn-around point on the tape based on the estimated distance, wherein at the turn-around point a tape drive writing to the tape to stop writing in a first direction and then continue writing in a second direction opposite from the first direction and towards a physical beginning of the tape.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Embodiments of the invention introduce a novel method for minimizing unload times in a tape drive system. FIG. 1 is a block diagram illustrating one embodiment of an exemplary tape drive for use in carrying out embodiments of the invention. Tape drive 100 includes a digital processing unit 101, read/write control 110, tape head 120, and media 130.

Digital processing unit 101 may receive user write data from an I/O controller (not shown) that is forwarded for storage, and may transmit received read data that is forwarded to the I/O controller, for instance. Particularly, digital processing unit 101 includes a data compression unit 102 and data formatting unit 105. Data compression unit 102 compresses write data to be stored at tape drive 100, and decompresses read data to be forwarded to a user. Data formatting unit conditions write data that is to be stored at tape drive 100.

Media 130 is a physical tape medium on which data is stored. In one embodiment, media 130 is a magnetic tape. Tape head 120 is an electromagnetic component which reads and writes onto media 130 as media 130 passes over it. Tape head 120 includes write elements 122 and read elements 124 to perform the write and read operations.

Read/write control 110 controls the reading and writing of data at tape drive 100. Read/write control 110 includes a write driver 112, a pre-amplifier 114, automatic gain and control (AGC) and filtering unit 116, read channel detection 117, and data protect 118. Write driver 112 is implemented to control the writing of user data to media 130.

Pre-amplifier 114 provides low noise amplification of a read signal received from read elements 124. AGC and filtering unit 116 includes an AGC component that is implemented to adjust for variations in signal amplitude and to keep a fixed input signal to read channel detection. A filtering component of unit 116 is used to shape waveforms for better detection and forwards to a read channel detection 117.

Data protect 118 uses ECC to protect user data. In one embodiment, data protect 118 performs Reed Solomon (RS) encoding by adding bytes of data to user bytes to enable recovery of user data bytes when some bytes are missing due to defects or damage to media 130. Data protect 118 also provides data interleave and rotation which distributes user data and RS bytes over a larger piece of media 130. According to a further embodiment, data protect 118 writes to media 130 sixteen channels at a time to allow data to be distributed across the width of media 130.

According to one embodiment, data protect 118 implements a recording format that provides a guaranteed fixed capacity. In order to provide this capacity, media 130 provides more recordable media than the fixed capacity requires. The extra recording space is used for write defect skipping. In this way, a system can guarantee, within some probability of defective media events, that the media will hold the advertised capacity.

Figure 2:
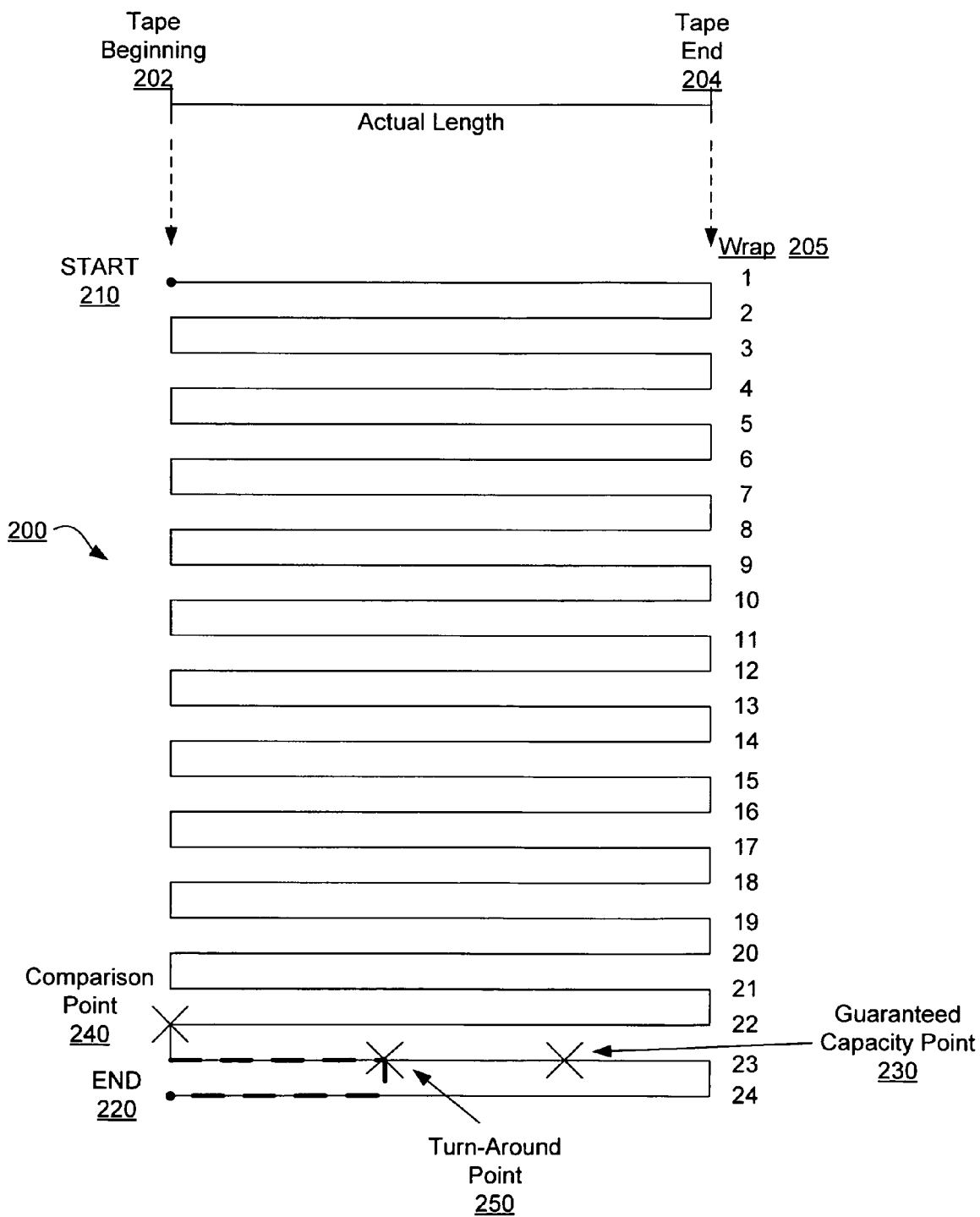
FIG. 2 is an illustration of one embodiment of a serpentine tape format.

FIG. 2 illustrates one embodiment of a serpentine tape format for media, such a media 130 described with respect to FIG. 1. A tape drive system, such as tape drive 100 described with respect to FIG. 1, may utilize this format to write data to a media, such as a tape. Tape 200 is the physical media data is stored on. As illustrated, tape 200 has a length of 800 meters from the beginning of the tape 202 to the end of the tape 204. This is purely an exemplary length for illustrative purposes and is not meant to be limiting. One skilled in the art will realize that a variety of tape types and lengths may be utilized in embodiments of the invention.

When writing to the tape 200 in a serpentine format, a tape head of a tape drive passes back and forth over the tape from the top to the bottom, writing data on each pass. Each forward and backward pass of the tape head over the tape 200 is known as a "wrap" 205. As shown in FIG. 2, in one embodiment, the tape head may perform 24 wraps 205 over the 800 meter length tape 200. In other embodiments, there may be more or less wraps in the serpentine tape format and the use of 24 wraps, as illustrated, is not meant to be limiting.

The process of writing data to the tape 200 in the serpentine format begins at wrap 1 at start 210, which is also the physical beginning 202 of the tape. Furthermore, the process of writing in the serpentine format ends at wrap 24 at end 220, which is also the physical beginning of the tape 202.

In one embodiment, as illustrated in FIG. 2, the tape 200 has a guaranteed capacity of 500 GB and the guaranteed capacity point 230 representing the 500 GB mark on the tape 200 resides along wrap 23. The actual data storage space of the tape (approximately 530 GB) is more than the guaranteed capacity of 500 GB in order to allow for expansion of the tape for write defect errors. If the tape 200 is written to without utilizing any of this extra space, then the tape head will stop at capacity point 230.

In a system where the tape itself moves in relation to a tape head in order to receive write data, the tape should be at the physical beginning 202 of the tape in order to unload the tape from the drive. If the tape is stopped at capacity point 230, this leaves a large distance for the tape 200 to be rewound in order to unload the tape from the tape drive, thereby creating time delays in unloading the tape.

To avoid these time delays due to significant amounts of tape distance to rewind, embodiments of the invention provide a mechanism to place a tape at, or as close as possible to, the physical beginning 202 of the tape 200 when a tape drive has finished writing in a serpentine format to the tape. In one embodiment, when a tape drive reaches a pre-determined point on the tape before the guaranteed capacity 230 of the tape is reached, it performs a comparison of the actual capacity used up to that point versus the expected capacity at that point. This point is called the comparison point 240.

An amount of write defect skipping that has occurred up to the comparison point 240 may be determined from the above-described comparison. In addition, a distance required for completing the advertised capacity may be determined from the comparison at comparison point 240. These two known amounts may be further utilized as described below.

Using these two amounts, the tape drive may estimate a turn-around point 250 on the tape. In one embodiment, this turn-around point 250 is determined by summing the above two known amounts together and then dividing this summation by two. The result is the distance to be traveled along the wrap from the comparison point before the tape 200 should turn around and continue towards the physical beginning of the tape. If the estimated turn-around point 250 is accurate, then, upon completion of writing, the tape 200 should be positioned at its physical beginning with the advertised guaranteed capacity met and unload time minimized.

As illustrated in FIG. 2, a bolded dashed line indicates the new path a tape 200 with serpentine format takes when a turn-around point 250 is utilized. This new path allows the tape drive to end writing on the tape at a point at or near the physical beginning of the tape 200, minimizing unload time for the tape and tape drive. Without the turn-around point 250, the tape drive may have ended its writing somewhere near the end of wrap 23 or beginning of wrap 24, leaving a significant amount of tape to rewind during an unload of the tape.

In one embodiment, the comparison point 240 is the point on the tape 200 where the serpentine format is on its last traverse to the physical end of the tape. As shown in FIG. 2, this point is at the end of wrap 22 and/or the beginning of wrap 23. In some embodiments, this is the point on a tape that begins the wrap where the advertised capacity will be met if no write defect skipping is utilized. In other embodiments, a margin may be accounted for by the turn-around point estimate in order to compensate for any mis-predictions and/or additional write defect skipping.

In other embodiments, the comparison point 240 may include multiple comparison points at various wraps in the serpentine format in order to provide more detailed information about trends in the tape's expansion. The multiple comparison points provide additional data on the write defect skipping being used by the tape, and whether the utilization of this defect space is increasing or decreasing.

Multiple comparison points may also provide a more accurate estimate of the resulting turn-around point 250, and thereby the final end point of the tape 200.

Figure 3:
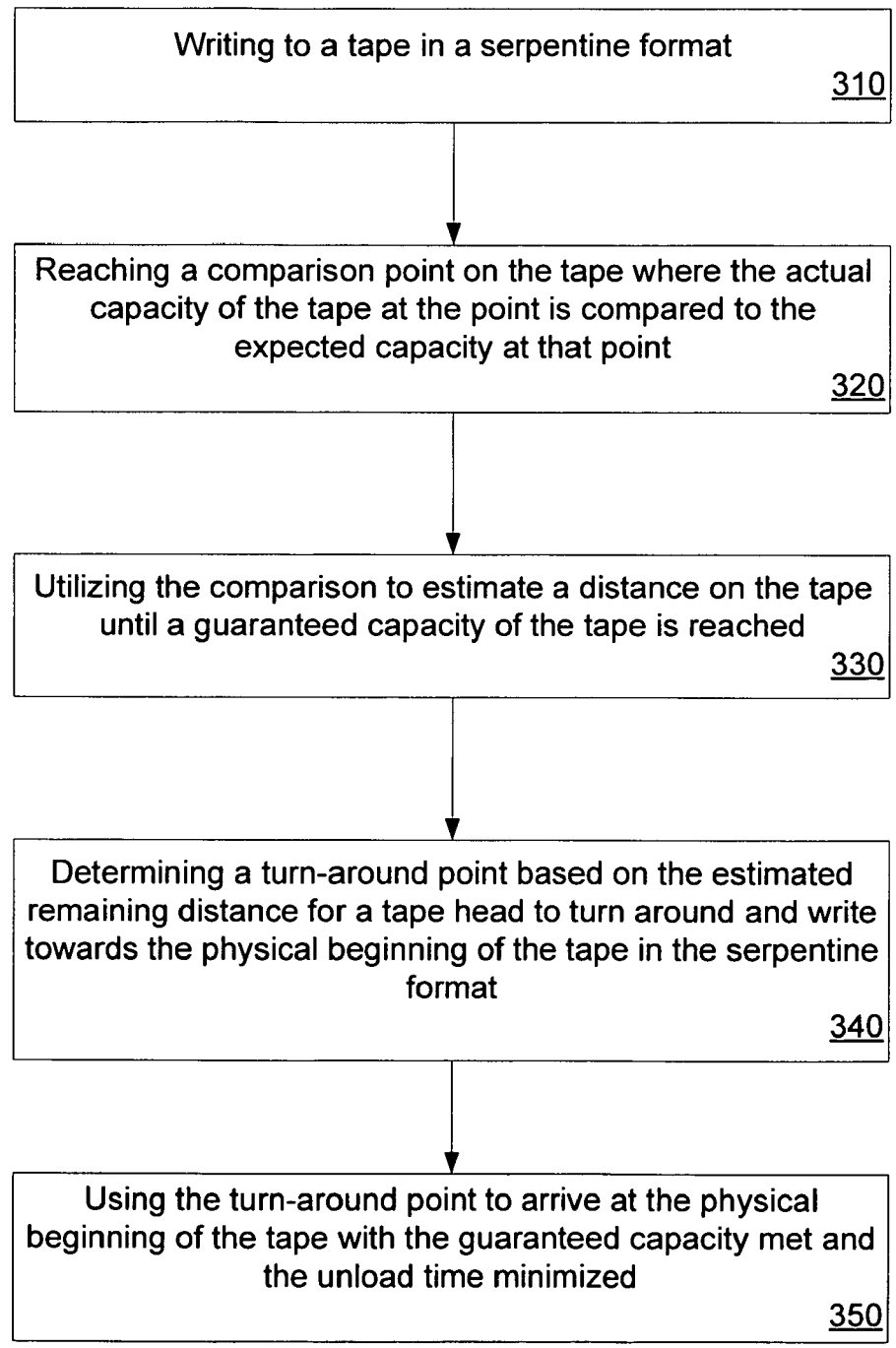
FIG. 3 is a flow diagram illustrating a method according to one embodiment of the invention.

FIG. 3 is a flow diagram depicting a method according to one embodiment of the invention. Process 300 is a method to minimize unload times in a tape drive system. In one embodiment, process 300 is performed by tape drive 100 described with respect to FIG. 1. Process 300 begins at processing block 310, where a tape drive writes to a tape in a serpentine format. Then, at processing block 320, the tape drive reaches a comparison point on the tape where it compares the actual capacity of the tape at that point versus the expected capacity of the tape at that point.

At processing block 330, the tape drive then utilizes the comparison to estimate a distance left on the tape from the comparison point until a guaranteed capacity of the tape is reached. This estimate may be determined in a similar fashion as discussed above with respect to FIG. 2. For example, the amount of defect skipping is determined from the comparison and added to the amount of capacity left to meet the guaranteed capacity. This sum is divided by two to arrive at the distance down the wrap from the comparison point to a turn-around point.

At processing block 340, the tape drive determines a turn-around point on the tape based on the estimated remaining distance. The turn-around point is the point on a wrap of the tape where the tape ends the wrap it was on and turns around to continue on the subsequent next wrap towards the beginning of the tape. In one embodiment, this point is on the last wrap traveling from the physical beginning to the physical end of the tape. Finally, at processing block 350, the tape drive utilizes the turn-around point to end at the physical beginning of the tape upon completion of writing to the tape, with the guaranteed capacity met and the unload time minimized.

Figure 4:
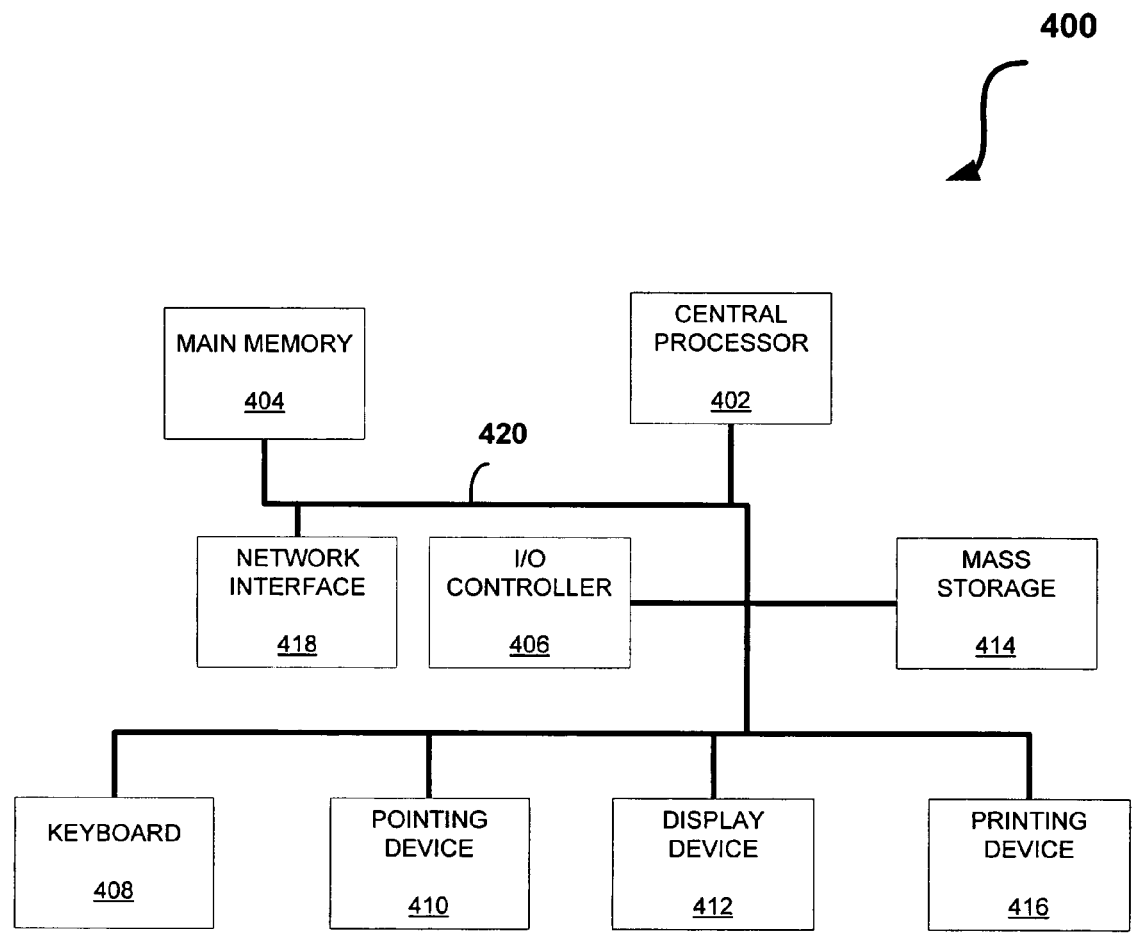
FIG. 4 is an illustration of an embodiment of a computer system.

FIG. 4 illustrates an exemplary computer system 400 in which certain embodiments of the present invention may be implemented. In one embodiment, the components of FIG. 1 may be implemented as system 400 or as components of system 400.

System 400 comprises a central processor 402, a main memory 404, an input/output (I/O) controller 406, a keyboard 408, a pointing device 410 (e.g., mouse, track ball, pen device, or the like), a display device 412, a mass storage 414 (e.g., a nonvolatile storage such as a hard disk, an optical drive, and the like), and a network interface 418. Additional input/output devices, such as a printing device 416, may be included in the system 400 as desired. As illustrated, the various components of the system 400 communicate through a system bus 420 or similar architecture.

In a further embodiment, system 400 may be a distributed computing system. In other words, one or more of the various components of the system 400 may be located in a physically separate location than the other components of the system 400. Such components may be accessed and connected via a network to the other components In accordance with an embodiment of the present invention, the computer system 400 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 402 may be a complex instruction set computer (CISC) microprocessor, a reduced instruction set computing (RISC) microprocessor, a very long instruction word (VLIW) microprocessor, a processor implementing a combination of instruction sets, and the like.

The network interface 418 provides communication capability with other computer systems on a same local network, on a different network connected via modems and the like to the present network, or to other computers across the Internet. In various embodiments of the present invention, the network interface 418 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 400 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 400 is a general purpose computer capable of running any number of applications such as those available from companies including Oracle, Siebel, Unisys, Microsoft, and the like.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
    writing an amount of data to a tape in serpentine format;
    reaching a comparison point on the tape, wherein at the comparison point an actual capacity of the tape is compared to an expected capacity of the tape;
    utilizing the comparison at the comparison point to estimate a distance from the comparison point until a guaranteed capacity for the tape is reached; and
    determining a turn-around point on the tape based on the estimated distance, wherein at the turn-around point a tape drive writing to the tape to stop writing in a first direction and then continue writing in a second direction opposite from the first direction and towards a physical beginning of the tape;
    whereby the amount of data written to the tape is substantially similar to the guaranteed capacity of the tape.

2. The method of claim 1, further comprising the tape drive utilizing the turnaround point to arrive at the physical beginning of the tape with the guaranteed capacity fulfilled.

3. The method of claim 2, further comprising the tape drive utilizing the turnaround point to minimize unload time of the tape.

4. The method of claim 2, wherein the guaranteed capacity is less than an actual capacity of the tape in order to provide space for write defect skipping on the tape.

5. The method of claim 1, wherein the comparison point is a point on the tape where a last traverse of the serpentine format to a physical end of the tape is starting.

6. The method of claim 1, further comprising performing one or more additional comparisons at one or more additional comparison points on the tape, wherein the one or more additional comparisons provide information regarding trends in expansion of the tape for write defect skipping.

7. The method of claim 6, wherein the information regarding trends is used to determine the turn-around point.

8. The method of claim 1, wherein determining the turn-around point further comprises:
    adding an amount of defect skipping occurring up to the comparison point to a distance required to complete the guaranteed capacity from the comparison point, wherein the amount of defect skipping and the distance required to complete the guaranteed capacity are known from the comparison;
    dividing a sum of the adding by two; and
    adding a result of the dividing to the comparison point to result in a distance from the comparison point to the turn-around point.

9. The method of claim 8, further comprising adding a margin to the result of the dividing in order to compensate for any mis-predictions in determining the turn-around point.

10. An article of manufacture, comprising a machine-accessible medium including data that, when accessed by a machine, cause the machine to perform operations comprising:
    writing an amount of data to a tape in serpentine format;
    reaching a comparison point on the tape, wherein at the comparison point an actual capacity of the tape is compared to an expected capacity of the tape;
    utilizing the comparison at the comparison point to estimate a distance from the comparison point until a guaranteed capacity for the tape is reached; and
    determining a turn-around point on the tape based on the estimated distance, wherein at the turn-around point a tape drive writing to the tape to stop writing in a first direction and then continue writing in a second direction opposite from the first direction and towards a physical beginning of the tape;
    whereby the amount of data written to the tape is substantially similar to the guaranteed capacity of the tape.

11. The article of manufacture of claim 10, further comprising the tape drive utilizing the turn-around point to arrive at the physical beginning of the tape with the guaranteed capacity fulfilled.

12. The article of manufacture of claim 11, further comprising the tape drive utilizing the turn-around point to minimize unload time of the tape.

13. The article of manufacture of claim 10, wherein the comparison point is a point on the tape where a last traverse of the serpentine format to a physical end of the tape is starting.

14. The article of manufacture of claim 10, wherein determining the turnaround point further comprises:
   adding an amount of defect skipping occurring up to the comparison point to a distance required to complete the guaranteed capacity from the comparison point, wherein the amount of defect skipping and the distance required to complete the guaranteed capacity are known from the comparison;
   dividing a sum of the adding by two; and
   adding a result of the dividing to the comparison point to result in a distance from the comparison point to the turn-around point.

15. The article of manufacture of claim 14, wherein the determining the turnaround point further comprising adding a margin to the result of the dividing in order to compensate for any mis-predictions in determining the turn-around point.

16. An apparatus, comprising:
   a tape to store an amount of media; and a tape drive to write the media to the tape, the tape drive including:
      a tape head to physically write the media to the tape; and
      a control unit to:
         write to the tape in a serpentine format;
         utilize a comparison at a comparison point on the tape to estimate a distance from the comparison point until a guaranteed capacity for the tape is reached; and
         determine a turn-around point on the tape based on the estimated distance, wherein at the turn-around point the tape drive to stop writing in a first direction and then continue writing in a second direction opposite from the first direction and towards a physical beginning of the tape;
   whereby the amount of media written to the tape is substantially similar to the guaranteed capacity of the tape.

17. The apparatus of claim 16, wherein the comparison at the comparison point includes contrasting an actual capacity of the tape at the comparison point against an expected capacity of the tape at the comparison point.

18. The apparatus of claim 16, further comprising the tape drive utilizing the turn-around point in order to arrive at the physical beginning of the tape with the guaranteed capacity met and minimize an unload time of the tape.

19. The apparatus of claim 16, wherein the comparison point is the point on the tape where a last traverse of the serpentine format to a physical end of the tape is starting.

20. The apparatus of claim 16, wherein to determine the turn-around point further comprises:
   adding an amount of defect skipping occurring up to the comparison point to a distance required to complete the guaranteed capacity from the comparison point, wherein the amount of defect skipping and the distance required to complete the guaranteed capacity are known from the comparison;
   dividing a sum of the adding by two; and
   adding a result of the dividing to the comparison point to result in a distance from the comparison point to the turn-around point.

* * * * *